United States Patent [19]
Merritt

[11] Patent Number: 5,475,756
[45] Date of Patent: Dec. 12, 1995

[54] METHOD OF AUTHENTICATING A TERMINAL IN A TRANSACTION EXECUTION SYSTEM

[75] Inventor: Michael J. Merritt, Naperville, Ill.

[73] Assignee: AT&T Corp., Murray Hill, N.J.

[21] Appl. No.: 198,800

[22] Filed: Feb. 17, 1994

[51] Int. Cl.⁶ .............................. H04K 1/00; H04L 9/00
[52] U.S. Cl. ........................................ 380/24; 340/825.34
[58] Field of Search .................... 380/23–25; 340/825.34

[56] References Cited

U.S. PATENT DOCUMENTS

| | | |
|---|---|---|
| 3,742,451 | 6/1973 | Graham et al. . |
| 4,186,871 | 2/1980 | Anderson et al. . |
| 4,529,870 | 7/1985 | Chaum . |
| 4,799,061 | 1/1989 | Abraham et al. . |
| 4,912,762 | 3/1990 | Lee et al. ................................. 380/24 |
| 4,993,068 | 2/1991 | Piosenka et al. ......................... 380/23 |
| 5,390,247 | 2/1995 | Fischer ..................................... 380/25 |

OTHER PUBLICATIONS

Brassard, Gilles and Goutier, Claude, "A Password Scheme Secure Against Wire Taps," Jun. 11, 1980, pp. 1–8.
Evans, Arthur Jr., Kantrowitz, William, "A User Authentication Scheme Not Requiring Secrecy in the Computer," Communications of the Association for Computing Machinery, Inc., vol. 17, No. 8, Aug. 1974, pp. 437–442.
Even, Shimon, "Secure Off-Line Electronic Fund Transfer Between Nontrusting Parties," Computer Science Department, Israel Institute of Technology.
Popek, Gerald J. and Kline, Charles S., "Encryption and Secure Computer Networks," Computing Surveys, vol. 11, No. 4, Dec. 1979, pp. 331–356.
Woo, Thomas Y. C. and Lam, Simon S., "Authentication for Distributed Systems," Computer, Jan. 1992, pp. 39–52.

*Primary Examiner*—Stephen C. Buczinski

[57] ABSTRACT

The invention provides for a method of authenticating to a user or customer a terminal, such as an automatic teller machine, in a transaction execution system. The terminal is authenticated by a central host using cryptographic techniques, and a personal security phrase is sent from the host to the terminal. A message, incorporating the personal security phrase, is communicated to the customer by the terminal, thereby indicating that the terminal is legitimate. The terminal is authenticated to the customer prior to his entering any secret or confidential information, such as a personal identification number, into the terminal.

23 Claims, 5 Drawing Sheets

5,475,756

METHOD OF AUTHENTICATING A TERMINAL IN A TRANSACTION EXECUTION SYSTEM

FIELD OF THE INVENTION

The present invention relates generally to transaction execution systems. More particularly, the present invention relates to authenticating to a user components of a transaction execution system having a central host in communication with remote terminals which permit the execution of transactions such as the issuance of cash or the transfer of funds between accounts.

BACKGROUND OF THE INVENTION

Use of transaction terminals such as automatic teller machines (ATMs) which are operable at all hours has been widely accepted to satisfy needs for dispensing cash and performing other financial transactions at unmanned locations. The convenience of ATMs has made them extremely popular with the general public. Furthermore, owners of retail merchandise stores have found that the on-premise location of an ATM attracts customers into the retail location, which in turn increases the number of cash purchases by customers. As a result, ATMs are often located at locations remote from the associated financial institutions, such as banks. Such a distributed system of ATMs or other transaction terminals poses several intricate security problems.

The financial industry is particularly concerned about these security issues. For example, electronic funds transfer (EFT) systems that employ ATMs typically do not require the user's signature, which may be forged easily, on an instrument in order to perform a transaction. Rather, the user's secret personal identification number (PIN) and plastic bank card or transaction card serve the purpose of identifying and verifying the user to the EFT system. The PIN may be, for example, a four-digit number. Typically, after the user inserts his bank card into a slot in the ATM, the ATM prompts the user for his PIN. The user then enters his PIN into a keyboard associated with the ATM, which then compares the PIN with information stored in a database connected to the ATM. The transaction is allowed to proceed only if the comparison indicates that the proper PIN was entered.

Several security issues have arisen in connection with unauthorized persons obtaining the PIN and other account information of a legitimate customer. This situation is of particular concern because the unauthorized person can then gain access to the information stored in the private accounts of the legitimate customer as well as access to any funds stored in such accounts. In response to these concerns, the financial industry has employed various techniques to counter unauthorized uses of PIN numbers and bank cards. For example, it is known to use cryptographic operations in order to encode the PIN once the user has entered it into the keyboard associated with the ATM. Such techniques help prevent unauthorized persons from monitoring messages transmitted over network links and thereby obtaining PIN information.

Recently, highly sophisticated techniques have been used by unauthorized persons in order to obtain PIN and other account information. One such technique includes deploying a bogus ATM in a shopping mall or other public location. The bogus machine does not dispense cash when a customer inserts his bank or transaction card and enters his PIN. The machine does, however, retain and record the card account number and PIN which the customer entered in a vain attempt to make the machine dispense cash. The recorded information can then be used to create bogus plastic cards that simulate the action of the real bank cards. Together with the PINs recorded by the bogus machine, these cards can be used at legitimate ATMs to transfer or withdraw, for example, funds stored in other persons' bank accounts.

Schemes such as the one outlined above clearly indicate the need for a method of authenticating the ATM or other transaction terminal to a user or customer prior to his providing any secret or confidential information to the ATM or other transaction terminal.

Methods for authenticating hardware components to one another in a communication system by using cryptographic techniques are known in the art U.S. Pat. No. 4,799,061, "Secure Component Authentication System," issued to Abraham et al., for example, discloses one such method. These methods, however, do not provide for authenticating the components to a user or customer.

The problem of authenticating to a user a terminal that requires the user to enter confidential information has been previously recognized. One solution suggested in some references is to provide the user with a separate, personalized, portable terminal device. U.S. Pat. No. 4,529,870, "Cryptographic Identification, Financial Transactions, and Credential Device," for example, provides a cryptographic apparatus which may be utilized by its owner to identify himself to an external computer system, to perform various financial transactions with an external system, and to provide various kinds of credentials to an external system. In one embodiment, the apparatus is separable into a cryptographic device and a personal terminal device. The owner of the apparatus presumably has greater control over the personal terminal device, thereby making it less likely that confidential data would be improperly retained by a terminal such as a merchant's point of sale terminal. Such devices, however, require that additional hardware be incorporated into the card-like device and may require additional changes so that the device and other system components can communicate.

SUMMARY OF THE INVENTION

The present invention provides a method of authenticating to a user components of a transaction execution system having a central host in communication with remote terminals which permit the execution of transactions such as the issuance of cash or the inter-account transfer of funds. The method of the present invention includes the steps of receiving account information in a terminal; contacting through a communication line a host associated with an institution that issued said account information; sending at least a portion of said account information from said terminal to said host; sending a personal security phrase, corresponding to said account, from said host to said terminal; and communicating to said user at said terminal a message incorporating said personal security phrase, where the aforementioned steps occur prior to said user's entering any secret or confidential information into said terminal.

Additional features and advantages of the present invention will be apparent by reference to the following detailed description and accompanying drawings.

DETAILED DESCRIPTION

Figure 1:
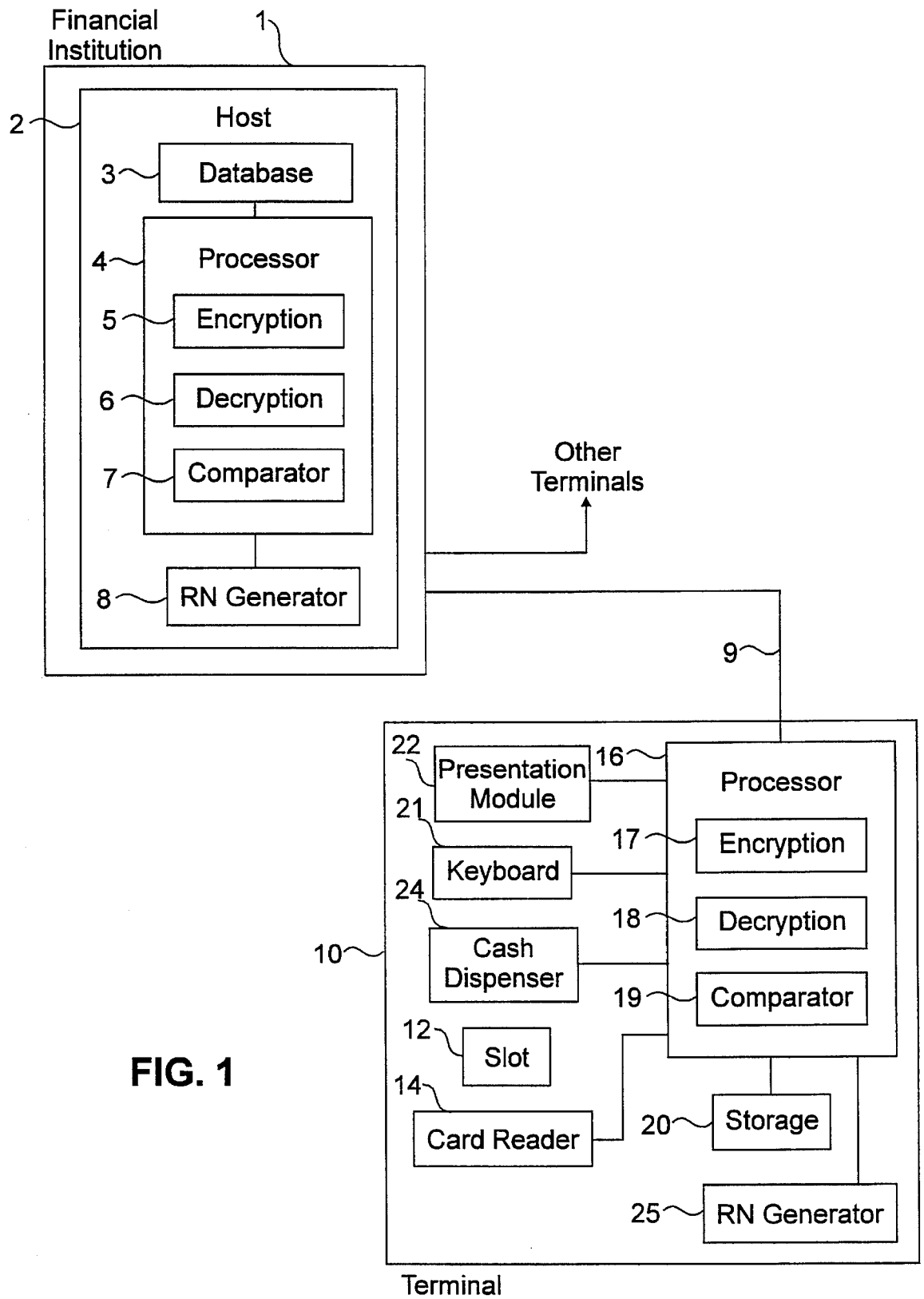
FIG. 1 is a block diagram showing an exemplary transaction execution system in which the present invention is particularly advantageous.

FIG. 1 illustrates an exemplary transaction execution system in which the present invention is particularly advantageous. Institution 1 is, for example, a financial institution such as a bank. The bank 1 includes a host 2 which has a database 3 and a processor 4. The processor 4 has encryption logic 5, decryption logic 6, and a comparator 7. The host 2 also includes a random number generator 8. Terminal 10 is, for example, one of a plurality of geographically dispersed automatic teller machines (ATMs) connected to the bank's host 2 by communication line 9 which may be, for example, a telephone line. The ATM 10 has a slot 12 for accepting and returning a bank card inserted by a customer as well as means 14 for reading information stored on the card. The reading means 14 is coupled to a processor 16 which includes encryption logic 17, decryption logic 18 and a comparator 19. A random number generator 25 is also connected to the processor 16. The ATM 10 also has means for storing information or data 20 connected to the processor 16. In addition, the ATM 10 has a keyboard 21 and a presentation module 22 which are coupled to the processor 16. The presentation module 22 may be, for example, a display screen, which may include means for displaying a still image or a sequence of images, such as a video screen with a video card. The presentation module 22 may also include means for communicating voice or sound, such as a loudspeaker with a speech card. Finally, the ATM 10 has a second slot 24, also connected to the processor 16, for dispensing cash. Additional terminals, not shown in FIG. 1, also may be connected to the bank's host 2.

When a new terminal, such as the ATM 10, is brought on-line as part of the transaction execution system of FIG. 1, the bank 1 assigns it a serial number, S, and an encryption key, K. The serial number, S, may be, for example, a ten-digit number or a number of some other suitable length. The encryption key K is one that can be used in a secure encryption scheme. K may be, for example, a 56-bit Data Encryption Standard (DES) key for use in a cryptosystem such as the one described in "Data Encryption Standards," FIPS Pub 46, National Bureau of Standards, (January 1977). This article and all other articles and patents referred to herein are incorporated by reference. The serial number and encryption key are stored both in the ATM's storage means 20 and in the bank's host 2.

When a customer at the bank 1 registers to obtain an account, he is assigned an account number. The bank 1 typically provides the customer with a plastic transaction or bank card which has a magnetic strip containing pertinent account information. This information typically includes a number identifying the bank that issued the card, the customer's account number, and the customer's name. It may, however, include other information as well. (The transaction card also may be a smart card, for example, such as the one described in U.S. Pat. No. 4,795,898.) The customer then chooses or is assigned a personal identification number (PIN), which may be, for example, a four-digit number. The PIN generally is meant to be kept confidential and not communicated to persons who do not have authority to use the card. In accordance with the method of the present invention, the customer also chooses or is assigned a personal security phrase (PSP). The personal security phrase may be any combination of words or alpha-numeric characters whose total length is not greater than a pre-determined length, but preferably it is a phrase which is relatively easy for the particular customer to remember or recognize. The PSP is not limited, however, to alpha-numeric characters. It may also be a still image or sequence of images that can be transmitted electronically. Similarly, the PSP may be in the form of recorded speech or sound. As with a PSP that takes the form of some combination of alpha-numeric characters, a video or audio PSP is preferably relatively easy for the customer to remember or recognize. The PSP then is entered by employees of the bank 1 into the host 2 along with other account information, including the customer's name, the customer's account number, and the customer's PIN. Typically, the PIN itself is not stored in the host 2, but rather an encryption or hashed version of the PIN is stored by using, for example, a one-way function. Such one-way functions are well-known in the art and are described in A. Evans et al., "A User Authentication Scheme Not Requiring Secrecy in the Computer," Comm. ACM, vol. 17, No. 8, pp. 437–442 (1974). The PSP need not be stored in an encrypted form, although it may be stored in an encrypted form.

Figure 2:
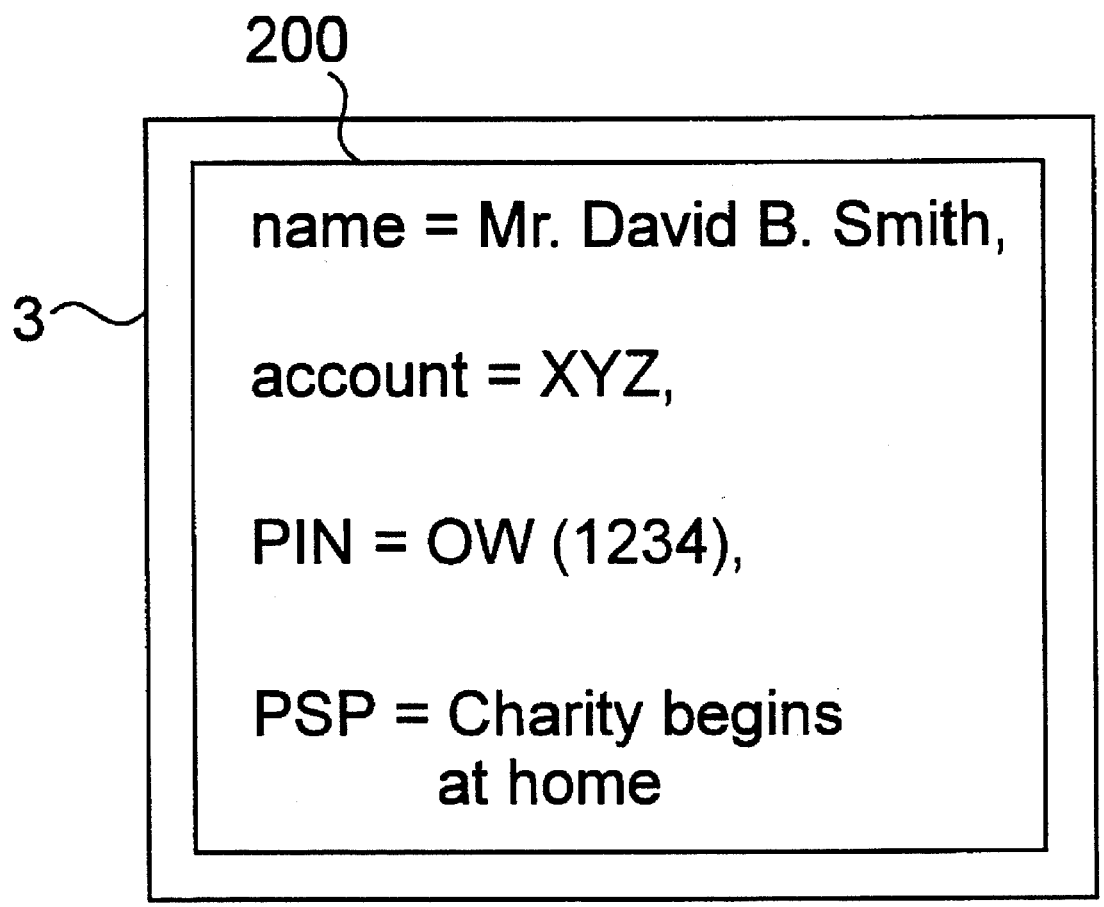
FIG. 2 shows an exemplary database entry according to the method of the present invention.

FIG. 2 shows an exemplary entry 200 in the bank's database 3. Assume, for the purpose of illustration, that the customer's name is Mr. David B. Smith, his account number is "XYZ", his PIN is "1234", and his PSP is "Charity begins at home." The bank's database 3 would then contain the following entry 200: "name=Mr. David B. Smith, account= XYZ, PIN=OW(1234), PSP=Charity begins at home" as shown in FIG. 2. "OW(1234)" is the encrypted form of the PIN using a specified one-way function.

Figure 3:
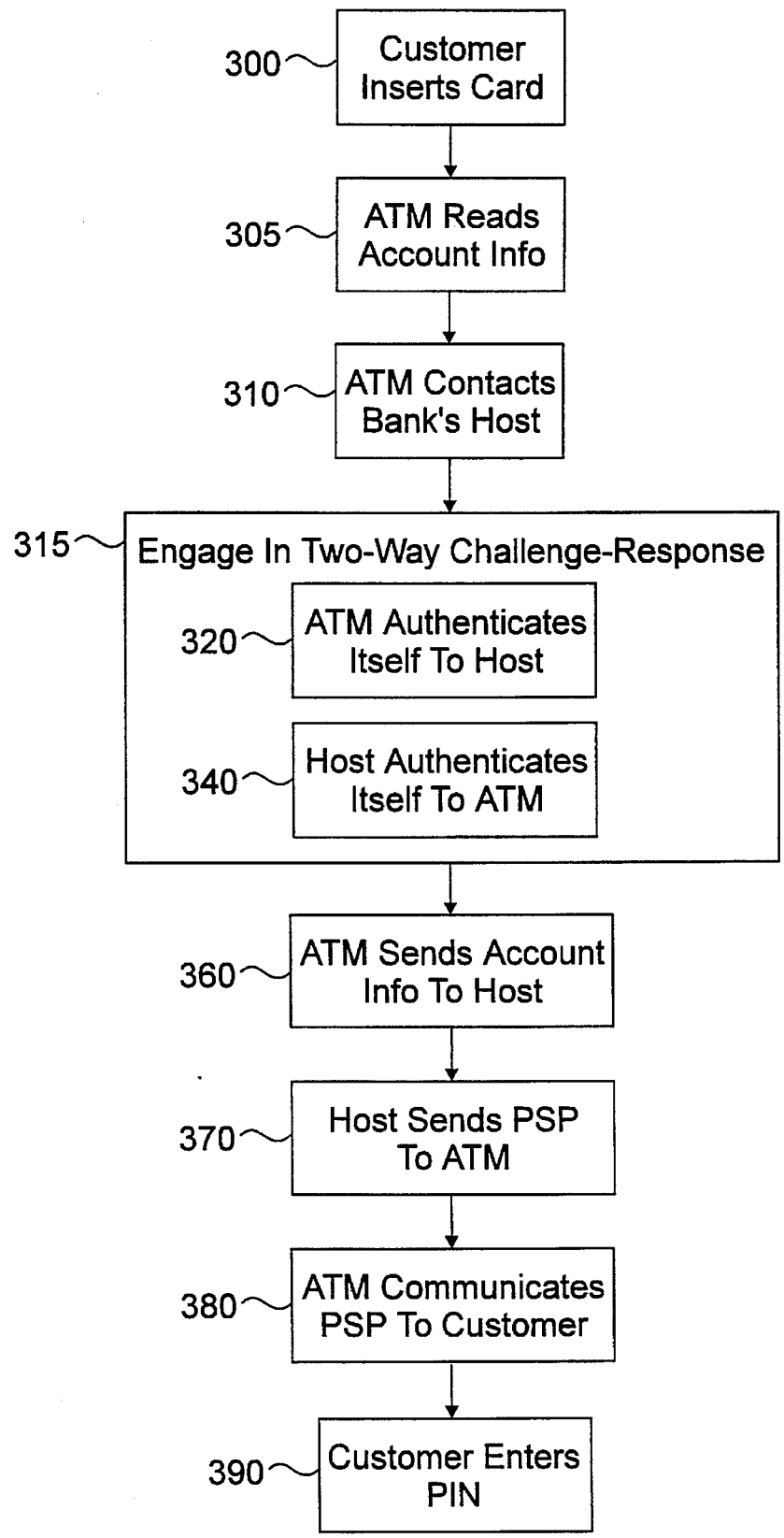
FIG. 3 is a flow chart showing the steps of an authentication process according to the method of the present invention.

FIG. 3 is a flow chart of an authentication process according to the method of the present invention. When a customer, for example Mr. David B. Smith, wishes to perform a financial transaction using a terminal, such as the ATM 10, he inserts his bank card into the slot 12 in the ATM 10 as shown in step 300. The ATM reads the account information from the card in step 305. As indicated above, this information typically would include the customer's name, David B. Smith, and the account number, XYZ. Of course, in some transaction execution systems, the customer might enter the account information into the terminal manually rather than by inserting a machine readable card into the terminal. Next, in step 310, the ATM 10 contacts the bank's host 2 over communication line 9. The ATM 10 and the bank's host 2 engage in a two-way challenge-response, discussed more fully below, in step 315. More specifically, the ATM 10 authenticates itself to the bank's host 2 in step 320 to ensure that it is legitimate. The bank's host 2 authenticates itself to the ATM 10 in step 340 to ensure that the ATM 10 has contacted a legitimate bank.

The two-way challenge-response that takes place between the ATM and the bank's host is not limited to any particular form so long as each can authenticate itself to the other.

Figure 4:
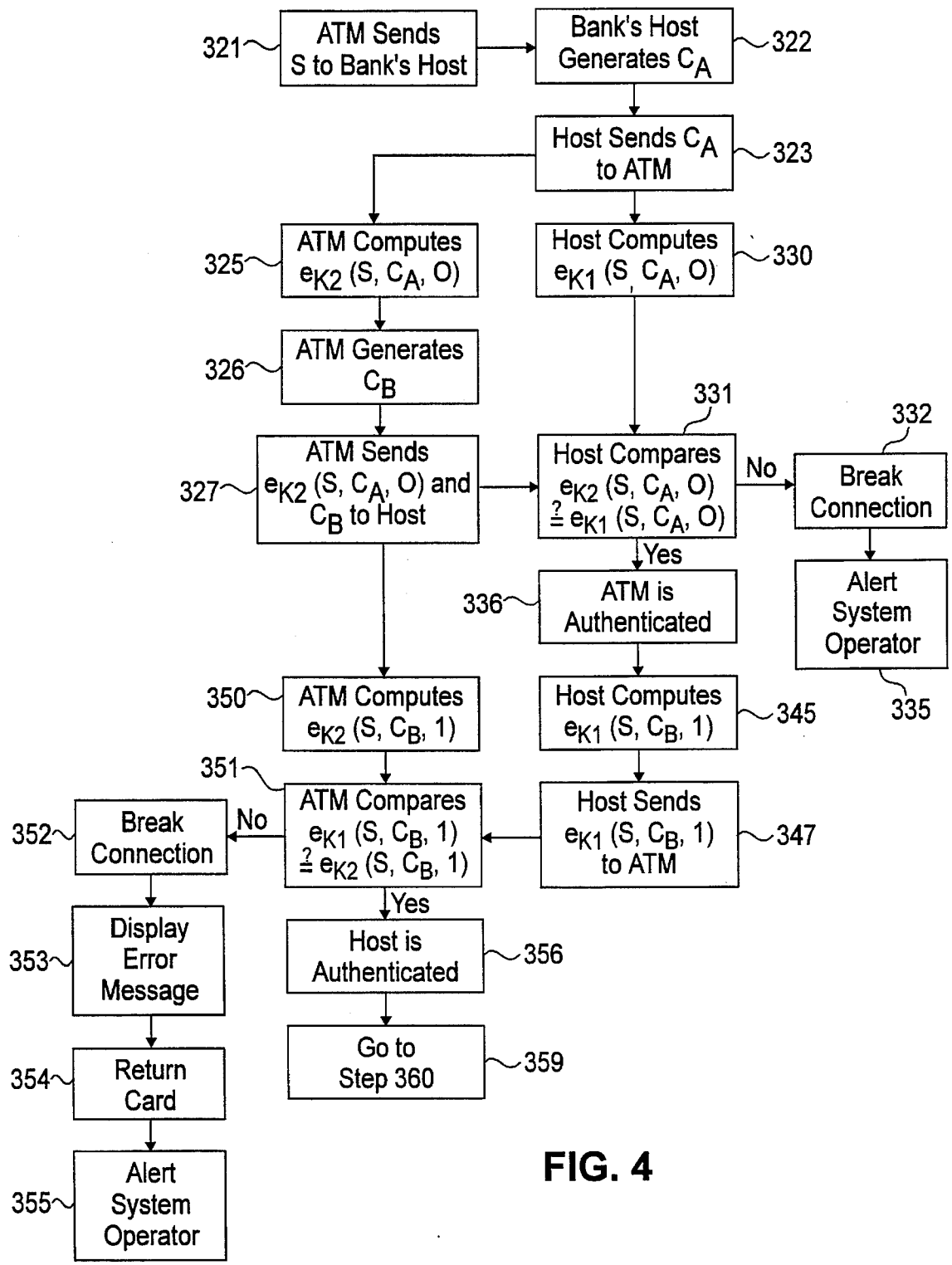
FIG. 4 is a flow chart showing the steps of a preferred embodiment for authenticating a terminal and host to one another in accordance with the present invention.

Methods for authenticating components in a communication system are known in the art. In one embodiment of the invention, the authentication scheme uses cryptographic techniques to determine whether each has the proper key. In particular, each component verifies that the other holds an identical encryption key. One such authentication scheme is disclosed in U.S. Pat. No. 4,799,061, referred to above. A preferred embodiment for verifying the identity of the keys held by a bank's host and stored in an ATM is shown in FIG. 4. For the purpose of illustration, it is assumed that the terminal and bank attempting to verify one another are the ATM 10 and the host 2, respectively. Furthermore, for the purpose of illustration, it is assumed that the host has an encryption key K1, and the ATM has an encryption key K2. Of course, if the bank and the ATM are legitimate, then the two keys, K1 and K2, are identical, and they are, by definition, identical to the key K.

Referring to FIG. 4, the ATM 10 sends its serial number S to the bank's host 2, as shown in step 321. This information is not sent in encrypted form. Next, the host 2 generates a first random number $C_A$ using the random number generator 8 in step 322. The host 2 then sends the random number $C_A$ to the ATM 10 in step 323. Again, this information need not be sent in encrypted form. In step 325, the ATM 10 computes $e_{K2}(S, C_A, 0)$, the encryption of S, $C_A$ and a first direction code, using its key K2 and the encryption logic 17. Although the direction code is shown as a direction bit "0", other direction codes may be used as well. The ATM 10 also generates a second random number $C_B$ using the random number generator 25 in step 326. Next, the ATM 10 sends $C_B$ and its encryption of S, $C_A$ and the first direction code to the host 2 as shown in step 327. In step 330, which can occur either prior to the steps 325–327, concurrent with the steps 325–327, or subsequent to the steps 325–327, the host 2 computes $e_{K1}(S, C_A, 0)$, the encryption of S, $C_A$ and the first direction code, using its key K1 and the encryption logic 5. Then, subsequent to the steps 327 and 330, the host 2 compares in comparator 7 its encryption of S, $C_A$ and the direction code to the ATM's encryption of the same information as shown in step 331. If the encrypted values are not equal, then, in step 332, the host 2 disconnects the communication line that was established with the ATM 10. Also, as shown in step 335, the host 2 alerts a system operator of the possibility of an illegitimate terminal connected to the transaction execution system. On the other hand, if the host 2 verifies that the encrypted values are equal, then the ATM 10 is authenticated as shown in step 336. In step 345, the host 2 proceeds to compute $e_{K1}(S, C_B, 1)$, the encryption of S, $C_B$, and a second direction code, different from the first direction code, using its key K1 and the encryption logic 5. The host 2 then sends its encryption of S, $C_B$, and the second direction code to the ATM 10 in step 347. In step 350, which can occur either prior to the steps 345 and 347, concurrent with those steps. or subsequent to those steps, the ATM 10 computes $e_{K2}(S, C_B, 1)$, the encryption of S, $C_B$ and the second direction code, using its key K2 and the encryption logic 17. The ATM 10 then compares, using the comparator 19, its encryption of S, $C_B$, and the second direction code to the host's encryption of the same information as shown in step 351. If the encrypted values are not equal, then, in step 352, the ATM 10 disconnects the communication line that was established with the host 2. The ATM 10 then displays, on the presentation module 22, an error message, as shown in step 353, and returns the customer's card through slot 12, as shown in step 354. Also, in step 335, the ATM 10 alerts a system operator of the possibility of an illegitimate host connected to the transaction execution system. On the other hand, if the ATM verifies that the encrypted values are equal, then the host 2 is authenticated as shown in step 356. The step 356 completes the two-way challenge-response between the bank's host 2 and the ATM 10. As indicated in the step 359, the method of the present invention continues in step 360 of FIG. 3.

It should be noted that variations in the aforementioned two-way challenge-response can be made. For example, in place of steps 330–331, the host 2 would decrypt, using its key K1 and decrypt logic 6, the encrypted information received from the ATM 10 in step 327 and verify that S, $C_A$, and the first direction code are retrieved. If they are retrieved, then the ATM would be authenticated as in step 336. Similar modifications, can be made to the steps 350–351. Specifically, the ATM 10 would decrypt, using its key K2 and decrypt logic 18, the encrypted information received from the host 2 in step 347 and verify that S, $C_B$, and the second direction code are retrieved. If they are retrieved, then the host 2 would be authenticated as in step 356.

Referring again to FIG. 3, the ATM 10 sends the account information to the bank's host 2 in step 360. The host 2 retrieves from the database 3 the information contained in the entry 200 corresponding to the customer's account and sends to the ATM 10 the customer's PSP, "Charity begins at home" in step 370. The customer's PIN, encrypted with the one-way function, also can be sent to the ATM 10 at this time for use as explained below. The ATM 10 then authenticates itself to the customer in step 380 by communicating a message incorporating the customer's PSP. For example, the ATM 10 would display, on the presentation module 22, the following message: "Good morning Mr. Smith. Your Personal Security Phrase is 'Charity begins at home.' If this is correct, please enter your four-digit personal identification number." Only if the customer, Mr. Smith, recognizes the PSP as his own would he enter his PIN on the keyboard 21 in step 390. If the PSP is in the form of a still image or sequence of images, then a similar message would be communicated to the customer with the alpha-numeric PSP replaced by the video PSP. Similarly, if the PSP is in the form of recorded speech or sound, then a similar message would be communicated to the customer with the alpha-numeric PSP replaced by the audio PSP communicated audibly through the presentation module 22.

In a preferred embodiment, once the ATM 10 and host 2 have authenticated each other, all subsequent communications between them are sent in an encrypted form in order to secure their communications. The ATM 10 and the host 2 can, for example, continue using the shared key K. Alternatively, they can negotiate a session key or secure the line 9 by some other mechanism according to well-known methods in the art.

For the purpose of illustration, it will be assumed that the ATM 10 and the host 2 continue using the key K. A transaction identifier is also included in order to avoid reply attacks by unauthorized users. The transaction identifier may be, for example, one of the random numbers generated in the step 322 or the step 326. Alternatively, some other suitable transaction identifier may be used. For the purpose of illustration, it will be assumed that the random number $C_A$ is used as the transaction identifier.

Figure 5:
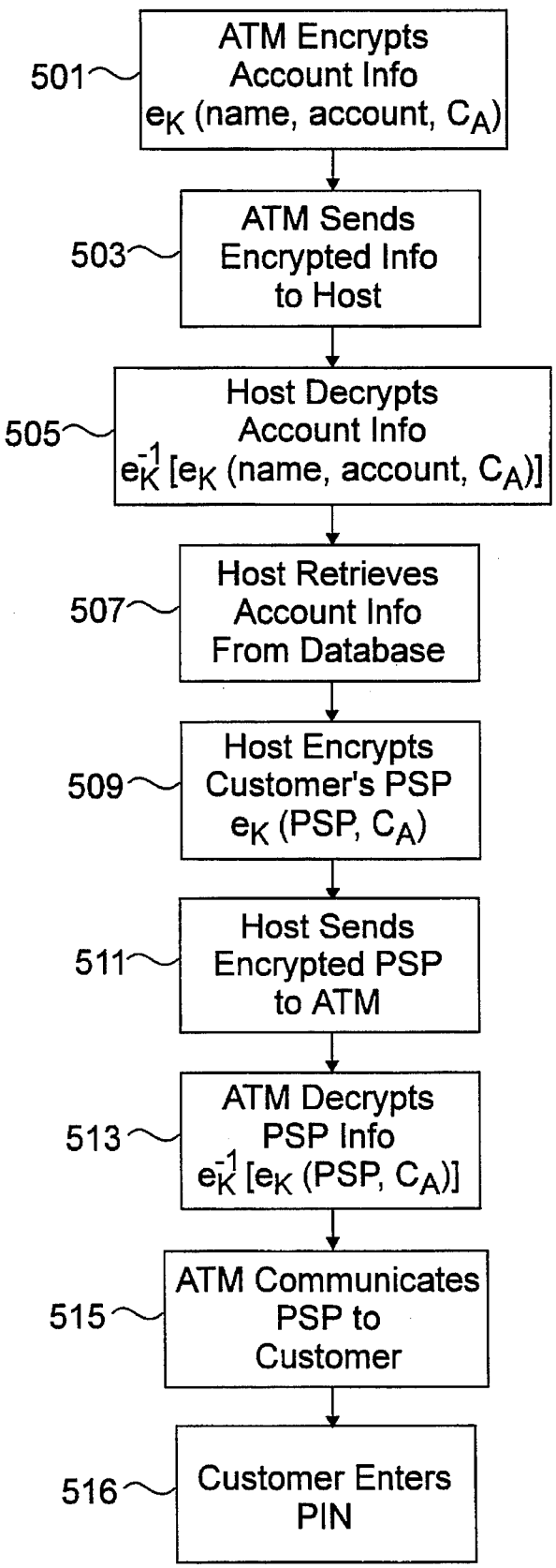
FIG. 5 is a flow chart showing the steps of a preferred embodiment for exchanging communications between a terminal and host in accordance with the present invention.

According to the preferred embodiment as shown in FIG. 5, the ATM 10 encrypts the account information, including the customer's name and the account number, and the random number $C_A$ using encrypt logic 17 and the key K as shown in step 501 and sends this information to the host 2 in step 503. Upon receiving the encrypted form of the account information, the host 2 decrypts the information using decrypt logic 6 and the shared key K in step 505. In FIG. 5, the term $e_K^{-1}$ represents a decryption using the shared key K. Then, in step 507, the host 2 retrieves from the database 3 the information contained in the entry 200 corresponding to the customer's account. In step 509, the host 2 encrypts the customer's PSP and $C_A$ using encrypt logic 5 and the shared key K. The host 2 then sends this encrypted information to the ATM 10 as shown in step 511. Upon receiving this information, the ATM 10 decrypts it using decrypt logic 18 in step 513. The method of the invention proceeds as before as shown in steps 380 and 390, which, for convenience, are replicated in FIG. 5 as steps 515 and 516. Again, only after the ATM 10 has authenticated itself to the customer by communicating the customer's PSP to him would the customer enter his PIN on the keyboard 21.

Once the customer has entered his PIN, the ATM 10 processes the PIN according to any one of the standard methods known in the art to authenticate a user. For example, the ATM 10 would send the PIN in encrypted form to the host 2. The host would then verify that a valid PIN was entered and instruct the ATM to permit the transaction to proceed. Alternatively, when a new terminal, such as terminal 10, is brought on-line, the bank 1 may also store in it the one-way function. In such a situation, the PIN, encrypted with the one-way function, would be sent to the ATM 10 along with the customer's PSP in the step 370 in FIG. 3 or in the step 511 in FIG. 5. Once the customer enters his PIN in the step 390 in FIG. 3 or in the step 516 in FIG. 5, the ATM 10 would encrypt it using the built-in one-way function and compare the result with the value received from the bank's host. If they are identical, the ATM 10 permits the transaction to proceed.

Although the invention has been described in terms of one bank which issues its own banks cards for use with a plurality of ATMs connected to the bank's host, the invention also may be used in an interchange system in which a plurality of banks agree to honor, in their own respective ATMs, cards issued by the other banks. Similarly, although the present invention has been described in terms of ATMs, it also can be used with other types of terminals, such as a merchant's point of sale terminal, which require a customer or user to enter confidential information. This and other alternative applications of the present invention will readily be clear to those of ordinary skill in the art. The present invention is, therefore, limited only by the appended claims.

I claim:

1. A method of authenticating a terminal in a transaction execution system to a user, said method comprising the steps of:
   receiving account information in said terminal;
   contacting through a communication line a host associated with an institution that issued said account information;
   sending at least a portion of said account information from said terminal to said host;
   sending a personal security phrase, corresponding to said account, from said host to said terminal; and
   communicating to said user at said terminal a message incorporating said personal security phrase, where the aforementioned steps occur prior to said user's entering any secret or confidential information into said terminal.

2. The method of claim 1 wherein the step of communicating a message incorporating said personal security phrase includes the step of displaying said personal security phrase on a presentation module connected to said terminal.

3. The method of claim 2 wherein the step of sending a personal security phrase includes the step of sending a personal security phrase having the form of a plurality of alpha-numeric characters.

4. The method of claim 3 wherein the step of sending a personal security phrase further includes the step of sending a personal security phrase having the form of a plurality of words.

5. The method of claim 2 wherein the step of sending a personal security phrase further includes the step of sending a personal security phrase having the form of a video image.

6. The method of claim 2 wherein the step of sending a personal security phrase further includes the step of sending a personal security phrase having the form of a sequence of video images.

7. The method of claim 1 wherein
   the step of sending a personal security phrase includes the step of sending a personal security phrase having the form of recorded sound; and
   the step of communicating a message incorporating said personal security phrase includes the step of audibly communicating said personal security phrase through a presentation module connected to said terminal.

8. The method of claim 1 wherein said terminal is an automatic teller machine.

9. The method of claim 8 wherein the aforementioned steps occur prior to said user's entering a personal identification number into said automatic teller machine.

10. The method of claim 9 wherein the step of communicating a message incorporating said personal security phrase further includes the step of instructing said user to enter his personal identification number into said automatic teller machine only if said user recognizes said personal security phrase as his own.

11. The method of claim 1 further including the step of authenticating said terminal to said host, where the step of authenticating said terminal occurs prior to the step of sending a personal security phrase from said host to said terminal.

12. The method of claim 11 wherein the step of communicating a message incorporating said personal security phrase includes the step of displaying said personal security phrase on a presentation module connected to said terminal.

13. The method of claim 12 wherein the step of sending a personal security phrase includes the step of sending a personal security phrase having the form of a plurality of alpha-numeric characters.

14. The method of claim 13 wherein the step of sending a personal security phrase further includes the step of sending a personal security phrase having the form of a plurality of words.

15. The method of claim 12 wherein the step of sending a personal security phrase includes the step of sending a personal security phrase having the form of a video image.

16. The method of claim 12 wherein the step of sending a personal security phrase includes the step of sending a personal security phrase having the form of a sequence of video images.

17. The method of claim 11 wherein
   the step of sending a personal security phrase includes the step of sending a personal security phrase having the form of recorded sound; and
   the step of communicating a message incorporating said personal security phrase includes the step of audibly communicating said personal security phrase through a presentation module connected to said terminal.

18. The method of claim 11 further including the step of authenticating said host to said terminal, where the step of authenticating said host occurs prior to the step of sending account information from said terminal to said host.

19. The method of claim 18 wherein said terminal is an automatic teller machine.

20. The method of claim 19 wherein the aforementioned steps occur prior to said user's entering a personal identification number into said automatic teller machine.

21. The method of claim 19 wherein the step of communicating a message incorporating said personal security phrase further includes the step of instructing said user to enter his personal identification number into said automatic teller machine only if said user recognizes said personal security phrase as his own.

22. The method of claim 21 wherein the step of authenticating said automatic teller machine to said host includes the steps of:

sending a serial number associated with said automatic teller machine to said host;

generating a first random number in said host;

sending said first random number from said host to said automatic teller machine;

computing in said automatic teller machine an encryption of said serial number, said first random number, and a first direction code, using a first secure key stored in said automatic teller machine;

sending said encryption of said serial number, said first random number, and said first direction code, using said first secure key, from said automatic teller machine to said host;

computing in said host an encryption of said serial number, said first random number, and said first direction code using a second secure key stored in said host;

comparing in said host said encryption of said serial number, said first random number, and said first direction code, computed using said first key, to said encryption of said serial number, said first random number, and said first direction code, computed using said second key; and verifying in said host that said encryption of said serial number, said first random number, and said first direction code, computed using said first key, and said encryption of said serial number, said first random number, and said first direction code, computed using said second key, are equal.

23. The method of claim 22 wherein the step of authenticating said host to said automatic teller machine includes the steps of:

generating a second random number in said automatic teller machine;

sending said second random number from said automatic teller machine to said host;

computing in said host an encryption of said serial number, said second random number, and a second direction code different from said first direction code, using said first key;

sending said encryption of said serial number, said second random number, and said second direction code, using said first key, from said host to said automatic teller machine;

computing in said automatic teller machine an encryption of said serial number, said second random number, and said second direction code, using said second key;

comparing in said automatic teller machine said encryption of said serial number, said second random number, and said second direction code, computed using said first key, to said encryption of said serial number, said second random number, and said second direction code, computed using said second key; and verifying in said automatic teller machine that said encryption of said serial number, said second random number, and said second direction code, computed using said first key, and said encryption of said serial number, said second random number, and said second direction code, computed using said second key, are equal.

* * * * *